June 11, 1935.  J. J. BAJDA  2,004,497
METHOD OF TREATING CACAO BEANS
Filed June 18, 1932
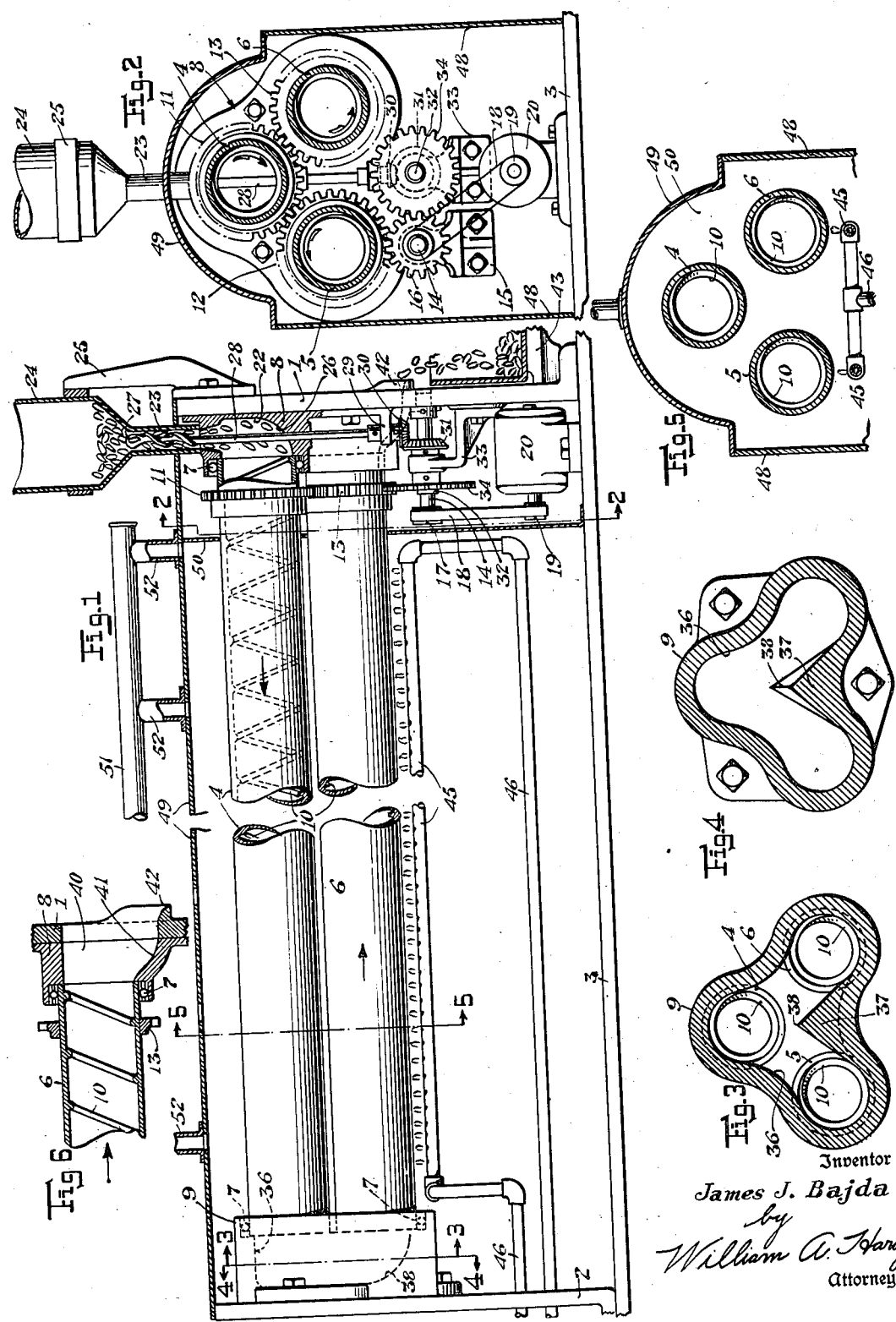
Inventor
James J. Bajda
by
William A. Hardy
Attorney Patented June 11, 1935

2,004,497

UNITED STATES PATENT OFFICE 2,004,497

METHOD OF TREATING CACAO BEANS

James J. Bajda, South Orange, N. J.

Application June 18, 1932, Serial No. 617,989

9 Claims. (Cl. 146—219)

My invention relates to cocoa and chocolate and more particularly to the production of cocoa and chocolate in the ordinary commercial powdered and molded forms which will have certain highly desirable and improved characteristics. My invention also relates to an improved method of producing cocoa and chocolate and to improved apparatus for carrying out a portion of such method.

Ripe cacao beans to be employed in the production of cocoa and chocolate are ordinarily prepared in suitable commercial form for the manufacture of these products, by subjecting them to certain preliminary treatments including fermentation, drying, cleaning, sorting, etc., which are required to obtain only dry, clean and unbroken beans of the quality and color desired.

Commercial cacao beans, that is, raw beans which have been subjected to the preliminary treatments referred to are brown or brownish-red in color and each consists of an outer hard shell and an inner kernel, called the nib, which is surrounded and separated from the shell by a thin membrane or skin. The beans resemble small flattened eggs in shape, and a full-sized bean is about an inch in length and weighs about a twentieth part of an ounce, approximately 12½% of the weight usually being in the shell.

In so far as the manufacture of cocoa and chocolate are concerned, the shell of the cacao bean is substantially worthless and its presence is highly undesirable. The flavor and aroma is confined almost entirely to the nib, while the shell is composed of hard, fibrous material which is relatively indigestible, and its presence in any appreciable quantity results in a gritty finished product (either cocoa or chocolate) which is distinctly rough to the palate. All first-class cocoas and chocolates are produced from the nib with as much as possible of the shell eliminated. It is accordingly apparent that the separation of the nib from the shell is a matter of vital importance to cocoa and chocolate manufacturers. The shell, however, is attached tenaciously to the nib and it is very difficult, indeed practically impossible, to remove it by any peeling or like simple process. On roasting the bean, however, the shell separates somewhat from the nib, dries and is rendered very brittle, whereupon it can readily be cracked and broken by gentle pressure and removed from the nib with great ease. Accordingly, it is quite generally the custom, in the industrial production of cocoa and chocolate from raw commercial cacao beans, to first roast the beans at a temperature of about 250 degrees F. for a period of from 35 minutes to 2 hours. The temperature at which the roasting is carried on and the period of roasting are dependent on various factors, such as the size, type, quality, and character of the beans, and the thickness of the shells. After roasting the beans are generally rapidly cooled and the dried brittle shells of the beans are then removed and almost completely separated from the nibs by a winnowing process.

The roasting of the beans, in addition to weakening and breaking down the shell structure, effects desirable changes in the nib material, such as sterilization, elimination of moisture and volatile fatty acids, and conversion of certain bitter tannins into phlobaphenes with consequent change in color to a deep brown and loss, to a great extent, of the bitter acrid taste. Besides these desirable changes, however, certain physiologically and otherwise valuable natural constituents of the nib are partly and in some cases wholly eliminated or destroyed by reason of the subjection of the beans to the effect of high temperature over an extended period during the roasting process.

It is well recognized that the nib of cacao beans includes an unknown but large number of substances and that present-day knowledge of the composition of many of these substances is extremely vague and incomplete. Accordingly it is impossible for me to specify positively all of the valuable constituents of the nib which are eliminated, either partly or wholly, as indicated, during the roasting of the beans as ordinarily carried on; yet in addition to certain fatty carbohydrate and protein components, there are certain lesser recognized or heretofore unrecognized constituents, especially lecithines, which are totally eliminated or destroyed. In this connection, I have found that the nib of raw cacao beans contains from 0.125% to 0.16% by weight of lecithin.

Lecithin, an esterlike compound of glycerophosphoric acid with two fatty acid radicals and cholin as an ammonium base, is obtained in commercial form, generally from the yolk of eggs, and is sometimes incorporated in certain medicants because of its pronounced and important physiological functions. It is both stimulating and nutritive, especially to the nervous system. When used therapeutically it has, upon ingestion, materially increased body-weight, blood corpuscles and hemoglobin content. When employed in the treatment of nervous diseases lecithin partakes in the development of the nervous system, and it has been found that it has a direct action in compensating for the loss of organic lecithin incidental to functional neurosis. Also by increasing assimilation it improves nutrition and effects such a restoration of the general condition of the patient that subjective and objective symptoms disappear.

The elimination of lecithines and other valuable constituents from the nib of cacao beans in the roasting process, as described, effects not only the subsequent treatment employed in obtaining the finished products (cocoa and chocolate), but also the color, aroma, flavor and nutritious value of such products.

The principal object of my invention is to produce cocoa powder and chocolate in the form of the finished products which contain a sufficient amount of lecithin, preferably, though not necessarily, derived from the natural content of this substance in the cacao beans from which said products are made, to appreciably increase the nutritious value and stimulating effect of such products and to favorably affect the color, aroma and flavor thereof.

Another object of my invention is to produce finished cocoa and chocolate which will contain a large percentage of the lecithin and preferably of the other valuable constituents indicated above, which were naturally present in the nib of the beans used in making such finished products.

My invention resides not only in the finished food products, cocoa and chocolate, containing the highly important and valuable constituents mentioned above, but also in an improved method or process for effectively and economically obtaining such products on a commercial basis and in improved apparatus which is especially adapted for carrying out part of such method or process and which is capable of handling large quantities of the material being treated.

In carrying out my improved process, I first treat raw fermented commercial cacao beans, that is beans which have been subjected to the preliminary treatment hereinbefore described, so as to effectively separate the nib from the shells and then further treat the nib (in a manner substantially but not quite similar to that customarily followed) to produce the finished cocoa or chocolate, the entire process being so carried out as to avoid to a great extent such treatment as would tend to eliminate or destroy the valuable nib constituents (and particularly lecithin) hereinbefore referred to, and yet render the technical operations reasonably free from difficulties.

In removing and separating the shell from the nib in accordance with my process, the raw cocoa beans are preferably subjected to heat so intense as to almost burn off the shell, preferably by successively bringing different surface portions of the beans into contact with a solid member or members preferably heated to a temperature of approximately 525 degrees F. This part of my process is preferably carried out by the use of suitable apparatus such, for example, as that which will be hereinafter described. As a result of this heat treatment the shells of the beans are weakened and rendered so brittle that they may be very readily broken and removed from the nib. The beans, however, are subjected to this treatment for such a short period of time that while a large part of the moisture and volatile fatty acids and other objectional and highly volatile substances in the nib (which are mostly closely adjacent the surface of the nib) are driven off, the temperature of the nib as a whole is raised only slightly and the elimination of the desirable and valuable constituents referred to above is accordingly materially lessened. To minimize the destruction or elimination of these desirable constituents, as well as for other purposes, the beans are preferably thoroughly refrigerated in any suitable apparatus just before being subjected to the roasting effects of the heat treatment described. In this refrigeration step the temperature of the beans is preferably lowered to about 32 degrees F. to 40 degrees F. The cooling of the beans, however, is in no way detrimental to the nib material, and the extent to which their temperature may be advantageously lowered is dictated only by practical limitations from an economical standpoint. As a matter of fact, the lower the temperature of the beans at the time they are subjected to the roasting treatment, the better would be the results obtained. In this connection the pre-cooling of the beans results in an extensive temperature gradient between the outer shells and the nib during the roasting treatment, and any substantial rise in temperature within the nib is delayed long enough for the shell to become so weakened and be rendered sufficiently brittle, under the effects of the heat to which the outside of the beans is subjected, as to permit subsequent easy removal thereof from the nib. The shell also expands somewhat under the influence of the heat applied thereto and tends to separate itself from the comparatively cool nib.

This pre-cooling or refrigerating step is a decidedly important feature of my improved process, as is apparent when it is realized that the undesirable decomposition and destruction of valuable bean constituents in processes heretofore employed are mainly due to the high temperature produced in the nib during the extended periods of heating to which the beans are subjected, especially in roasting.

It is preferable in accordance with my process, to subject the beans to the roasting operation only for such a period as is required to render the shell sufficiently weak and brittle for easy removal and separation thereof from the nib. I find that with the beans precooled or refrigerated as described, the roasting operation, when carried on so that substantially all parts of the outside of the beans are rapidly and thoroughly subjected to heat at temperatures approximating 525 degrees F., can generally be effectively performed in about four minutes where the cacao beans are of average size. The proper period of this roasting operation in any case is, of course, dependent upon the quantity of beans being treated and also upon the size, kind, shell-thickness, and other characteristics of the beans, and may vary anywhere from 2 to 6 minutes.

That part of my improved process hereinbefore described, results not only in retaining within the nib a large portion of such valuable and natural bean constituents as lecithin and associated nucleoproteins, and certain cacao tannins and related materials, which profoundly influence the color, flavor, nutritive value, etc., as developed in subsequent operations necessary to produce finished cocoa and chocolate, but is also decidedly advantageous from a manufacturing standpoint because of the resulting increase in the rate of output of said products. Such increase in the rate of output is especially marked in the production of chocolate, where it is of particular importance that the roasting of the beans should primarily be utilized for the removal and separation of the shell from the nib. The advantages which result from reducing the normal roasting period of from 35 to 60 or more minutes to 2 to 6 minutes, when considered from the standpoint of economical production, materially outweigh the trouble and expense which are encountered in precooling or refrigerating the beans.

The beans preferably immediately after subjection to the quick intense heat treatment described above and while still warm, are preferably vacuum dried, to eliminate substantially all of the moisture, fatty acids and other volatile objectionable substances which may then remain in the nib. The beans are then winnowed in the usual manner to effectively remove and separate the weakened brittle shell from the nib.

After the winnowing of the beans the resulting practically shell-free nib material is reduced to cacao mass by stone or roll grinding, and the mass is then subjected to such further treatment (which treatment is subject to wide variation) as may be necessary and desired to produce the finished product, either cocoa powder or chocolate.

Such treatment, when producing cocoa, may consist of heating the cacao mass, expressing cacao-butter from the melted cacao mass by subjection thereof to high pressure in a suitable press until there remains a hard compact mass called the "press-cake" having the butter content reduced to the desired proportion (which may vary from 10% to 30% of the entire mass and is usually 20% to 30% when the better grades of cocoa are being produced), breaking the "press-cake" into small pieces in a machine called a "cake-breaker" and cooling such pieces or permitting the same to cool until the cacao-butter therein sets and becomes hard, then beating or pulverizing (but not grinding) the small hard pieces of press-cake to divide the same into very small particles, sifting the resulting finely divided or powdered mass through a fine mesh silk sieve, thoroughly mixing any desired flavor or flavors with the sifted powder and finally packing this powder, as soon after it has been flavored as possible, in containers which are preferably air and light tight.

A good grade of chocolate, which is an intimate mixture of cacao and sugar, may be made entirely from cocoa powder to which is added the proper amount of free cacao butter. Sugar as finely divided as possible is then gradually added in a heated mixing machine, usually a melangeur, to obtain an intimate mixture of the materials. This mixture is then refined by passage through refining rolls, after which it is conchered or melangeured, flavored and molded into the desired final form or forms.

The cacao mass produced by grinding the shell-freed or winnowed beans, as hereinbefore described in connection with the production of cocoa powder, is sometimes termed "unsweetened chocolate" and contains the full amount of cacao-butter originally in the beans. The most common method of producing chocolate is to mix granulated sugar with this cacao mass and to treat the resulting mixture. In this method the cacao mass and granulated sugar are first thoroughly mixed in a melangeur. The mixture is then refined by passing the same between sets of rolls which are rotated at successively increasing speeds, so as to reduce the size of the particles therein and obtain a more intimate and homogeneous mixture of the sugar and cacao. The crude chocolate thus produced is further treated to reduce the size of the particles still more, to bring out the characteristic chocolate flavor and to bring the material to the proper liquid state for use in molding or covering machines. Such further treatment consists in introducing the chocolate into a conche, a melangeur or a similar machine where the same is subjected to agitation and a certain amount of grinding and aeration. The desired flavoring is also preferably added to the chocolate while the same is undergoing the treatment last described. Finally the chocolate is tempered so that the same will be of uniform temperature throughout and will have the proper degree of fluidity, and is then molded into desired forms, or is otherwise used as, for example, in coating of candy.

In the production of either cocoa powder or chocolate, an improved product will result by blending the nibs of several different kinds of cacao beans and by separating the "germ" from the rest of the nib. The blending is preferably effected by mixing, in proper proportions, the nibs of several different kinds of roasted and winnowed beans, just before the operation of reducing the nib material to cacao mass by grinding. The separation of the "germ" from the rest of the nib material is quite important in connection with the manufacture of chocolate, for the same is hard and contains but a slight percentage of cacao butter. Such separation is effected by breaking the nib material, after the removal of the shell, into small pieces and subjecting the latter to the action of a germ-separating machine.

During the preparation of both cocoa and chocolate, the cacao matter is also preferably treated with a suitable alkali, such as an alkaline carbonate, to remove the harshness or acridity of the raw beans and to improve the flavor, color, solubility and digestibility of the finished products. This treatment may be effected at the bean, nib or cacao mass stage. When the treatment is carried on at the mass stage, as is preferable, a solution of the desired alkali or alkalis is added to the mass while the latter is maintained in a liquid condition in a well heated melangeur. The solution is added in small quantities at intervals so as to permit the evaporation of water between each addition.

In the production of cocoa and chocolate in accordance with the methods herein described, the cacao material, subsequently to the steps involved in separating and removing the shell from the nib, is treated in manners which are substantially the same as are well known in the art, with the notable and important exception that the temperature to which such material is subjected at different stages is not permitted substantially to exceed 140–150 degrees F. during any extended period of time. Accordingly a goodly portion of the lecithin and other desirable and valuable constituents, hereinbefore designated, which were present in the raw beans and are retained in the nib material after the beans are roasted and winnowed in accordance with my improved method, will also be retained in the cacao material throughout the subsequent treatments and carried over to the finished cocoa and chocolate. Therefore these finished food products will have, to a very marked degree, those improved qualities and desirable characteristics the attainment of which is the main object of this invention.

My invention also includes within its scope the production of cocoa and chocolate which will have the indicated desirable qualities and characteristics due to the presence of the lecithin, by thoroughly and intimately mixing commercial lecithin with the cocoa and chocolate substantially at the completion of any of the usual well-known methods of making these products. In the case of cocoa the mixing of the commercial lecithin therewith is preferably effected immediately after the sifting of the cocoa powder, that is at the same time as the flavoring is added; while with chocolate such mixture is preferably effected either during the final refining step in the conche, melangeur or similar machine at or substantially at the time the flavoring is added, or during the tempering step just prior to molding. While the most desirable and efficacious proportion of lecithin (which may vary from about 0.2% to 1.0% but is generally preferably about 0.5% by weight of the finished product) may be thus readily incorporated in cocoa and chocolate in a simple and effective manner, commercial lecithin lacks some of the favorable characteristics of the natural lecithines of the cacao beans and is also somewhat less desirable for other reasons. Commercial lecithin, generally produced by involved treatment of the yolks of eggs, is also very expensive. Moreover in cocoa and chocolate which have commercial lecithin thus incorporated therein, the improved characteristics and qualities resulting from the hereinbefore indicated natural and valuable bean constituents other than lecithins, will be lacking.

The step of roasting the cacao beans in the production of cocoa and chocolate by the preferred methods of treatment herein described, may be performed by the use of various forms of apparatus. A preferred form of apparatus for rapidly and efficiently carrying out this roasting step is shown in the accompanying drawing, wherein:

Figure 1 is a view in side elevation, partly in section and partly broken away, of the said apparatus;

Figure 2 is a sectional view taken on line 2—2 of Figure 1;

Figure 3 is a sectional view taken on line 3—3 of Figure 1;

Figure 4 is a sectional view taken on line 4—4 of Figure 1;

Figure 5 is a sectional view taken on line 5—5 of Figure 1; and

Figure 6 is a fragmental sectional view of the discharge end portion of one of the lower rotatable drums or casings of the apparatus shown in Figure 1, and of the chute or passageway into which said drum discharges.

Referring to the drawing, the apparatus as shown, comprises spaced vertical standards 1 and 2 mounted on a suitable base 3, and a plurality of (preferably three) similar long cylindrical open-ended drums or casings 4, 5 and 6 which extend between the standards 1 and 2 and which are suitably supported at their ends by said standards for rotary movement about substantially horizontal axes. The drums 5 and 6 are spaced somewhat and are disposed at substantially the same level, while the drum 4 is disposed just above and between the drums 5 and 6. At their right hand ends, referring to Figure 1, the drums are respectively mounted by ball bearings 7 within cylindrical openings provided in a heavy casting or bracket 8 which is suitably secured, as by bolts, to the standard 1; while at their left hand ends said drums are similarly respectively mounted within cylindrical openings provided in a heavy casting or bracket 9 which is bolted to the standard 2. Each of said drums is provided with an inner spiral or helical rib or projection 10, which preferably extends substantially from one end of the drum to the other and the purpose of which will presently be explained. Each of the cylindrical drums is preferably 20 feet or more in length and of comparatively small diameter, preferably 10 inches or less.

The drums 4, 5 and 6 have similar annular gears 11, 12, and 13 respectively secured thereto adjacent their right hand ends (Figure 1), the gear 11 being in mesh with each of the gears 12 and 13. A shaft 14 is journaled in a bracket 15 which is suitably secured, as by bolts, to the standard 1, and on this shaft are secured a gear 16 and a pulley 17. The gear 16 meshes with the gear 12 on drum 5, and a belt 18 engages over the pulley 17 on shaft 14 and also over a pulley 19 secured to the shaft of a suitable motor 20 which is fixedly mounted on the base 3. The motor 20 when in operation, will through the belt connection and gearing just described, rotate the drum 4 in one direction and the drums 5 and 6 in the opposite direction, all at the same speed and about their respective longitudinal axes. The speed at which the drums should be rotated depends on the desired roasting period for the cacao beans and may be suitably regulated by adjusting the speed of motor 20.

The bracket 8 is provided with a chamber 22 having direct communication with the adjacent open end of the drum 4 and also with the vertical discharge spout 23 of a hopper 24 which is supported by a suitable bracket 25 secured to the standard 1. In the operation of the apparatus, the precooled cacao beans to be treated are fed from the hopper 24 through the spout 23 into chamber 22, and are directed by the lower curved wall surface 26 of said chamber to the drum 4. The beans are thus fed continuously and at a uniform rate from the hopper by a screw 27 disposed within the spout 23 and provided on the upper end portion of a vertical shaft 28. This shaft is journaled in a bracket 29 secured to standard 1 and also in the bracket 8, and extends up through the chamber 22 into the spout. A bevel gear 30 is secured to the lower end of shaft 28 and meshes with another bevel gear 31 which is secured to a horizontal shaft 32 journaled in the standard 1 and in a bracket 33 secured to said standard. A gear 34 is secured to the shaft 32 and meshes with the same gear 16 which is in mesh with the gear 12 on drum 5.

At its left hand end (Figures 1, 3 and 4) the drum 4 is in direct communication with the upper portion of a large substantially triangular chamber 36 provided in the bracket 9, and the drums 5 and 6 are in like communication with the lower portion of said chamber. The bottom of chamber 36 is provided with a centrally disposed and longitudinally extending projection 37, said projection being substantially triangular in transverse cross-section and decreasing in height away from the standard 2 so that its upper sharp edge 38 is curved as shown in Figure 1. The projection 37 constitutes a separating means for dividing the beans as they are discharged from the drum 4, into substantially equal portions which are respectively directed to the drums 5 and 6.

At their right hand ends, referring to Figures 1 and 6, the drums 5 and 6 respectively communicate with passageways 40 (only one of which is shown) which extend through both the bracket 8 and the standard 1. Each of the passageways 40 has an inclined and curved lower wall portion 41. A discharge lip in the form of a projection 42, is provided on standard 1 for each of said passageways about its lower portion. The passageways 40 are adapted to receive the beans from the drums 5 and 6 and discharge them either onto a conveyer (not shown) or into suitable receptacles which may be supported on a bracket 43 secured to the standard 1.

Suitable means are provided for effectively maintaining drums 4, 5 and 6 heated at the desired high temperature, such means, as shown, comprising gas burners 45 connected to supply pipes 46. The drums 4, 5 and 6, for the greater part of their length, and the burners 45 are enclosed within a casing so as to form a sort of oven or heating chamber. The casing comprises an end wall consisting of the standard 2, side walls 48, top 49, a bottom wall formed by the base 3, and an end wall 50 through which the drums extend at points just to the left (Figure 1) of the gears 11, 12 and 13. A duct 51 connected by short tubes 52 to the upper portion of the heating chamber or oven, serves to convey from the latter the gases of combustion and other gases resulting from the roasting operation.

The operation of the apparatus described above is briefly as follows: A supply of the refrigerated or precooled beans is constantly maintained in the hopper 24, and the speed of motor 20 and consequently the speeds at which the screw 27 and drums 4, 5 and 6 are rotated, are so regulated that the beans will be fed from the hopper, passed through the drum 4 and then through the drums 5 and 6, and discharged from the latter drums at such rates as will ensure the subjection of the beans to the roasting action only during the desired period. The beans are constantly agitated in their passage through the drums by reason of the rotation of the latter, and also, by the action of the spiral ribs or projection 10 on the insides of the rotating drums, are constantly moved or advanced lengthwise of the drums, first in one direction through drum 4 and then in the opposite direction through drums 5 and 6, as indicated by the arrows in Figure 1. It is therefore apparent that in their passage through the apparatus, different surface portions of the beans will successively be brought into direct contact with the highly heated walls of the drums and the accumulation of an appreciable quantity of beans at any point within the elongated heated zones afforded by the drums, is effectively prevented or avoided.

The heat at which the beans are treated in the roasting apparatus is so high, generally about 525 degrees F., that they can be subjected thereto only for a limited time without danger of detrimentally affecting the nib, as hereinbefore indicated. During such limited time, however, it is necessary that all portions of the shell of the beans be rendered sufficiently weak and brittle to permit easy removal thereof in the winnowing process. These results are very effectively accomplished by the construction and arrangement shown, wherein the beans are passed rapidly through the heating drums, and wherein, because of the length and/diameter of these drums and the rapid rotation thereof, there will be such a small quantity of beans at any given point that all the surface portions of each bean will be successively and effectively brought into direct contact with the drum walls. In the apparatus shown the beans discharged from the drum 4 are divided by the separator 37 into substantially equal portions which are respectively directed to the drums 5 and 6. Consequently the quantity of beans at a given point in each of the latter drums will be only about half of that at a given point in the drum 4. Such an arrangement in addition to greatly reducing the requisite over-all length of the apparatus, is also advantageous because a greater portion of the effective treatment of the shell of the beans is thereby obtained during the latter part of the passage of the beans through the apparatus and the capacity or output of the apparatus is accordingly greatly increased. With this apparatus the slow "soaking" heats to which the beans are usually subjected in roasting and which are so detrimental to the nib, are effectively avoided. Moreover the method of treatment is continuous, for there is a continuous and regulated feeding of the refrigerated beans to the apparatus and a corresponding discharge of treated beans therefrom.

While the apparatus shown and specifically described herein is a preferred form, it is to be understood that the same is subject to many changes and modifications without departure from the spirit or scope of my invention.

Having now described my invention, I claim:

1. The method of treating raw cacao beans which consists in refrigerating the beans and then heating the outer shells of the beans sufficiently to render the same weak and brittle while at all times maintaining the heating of the nib material of the beans below that which would result in any substantial elimination of lecithin or related organic substances from said material.

2. The method of treating raw cacao beans which consists in refrigerating said beans, then bringing different surface portions of said beans successively into direct contact with hot solid material, and removing said beans from association with said material when the outer shells of the beans have been rendered weak and brittle and before the temperature of the nib material of the beans becomes sufficiently raised to result in any substantial change in the organic structure thereof.

3. The method of treating raw cacao beans which consists in first thoroughly refrigerating the beans including the nib material thereof and then heating the refrigerated beans at such temperature and for such period of time as to weaken the shells of the beans but to avoid substantial loss of the volatile organic constituents from the nib material of the beans.

4. The method of treating raw cacao beans which consists in first thoroughly refrigerating the beans including the nib material thereof, subjecting the refrigerated beans to a temperature of from about 435 degrees F. to about 570 degrees F. for a period of from about two minutes to about six minutes, and then removing the outer shells of the beans.

5. The method of treating raw cacao beans which consists in first thoroughly refrigerating the beans including the nib material thereof, and then subjecting the refrigerated beans to a temperature of approximately 525 degrees F. for a period of approximately four minutes.

6. The method of treating raw cacao beans which consists in first thoroughly cooling the beans including the nib material thereof to substantially 40 degrees F. or less, and then subjecting the same to a high temperature for such period of time as to render the outer shells thereof weak and brittle but to avoid substantial loss of the volatile organic constituents from the nib material of the beans.

7. The method of treating raw cacao beans which consists in first thoroughly cooling the beans including the nib material thereof to substantially 40 degrees F. or less, and then subjecting the same to a temperature of from about 435 degrees F. to about 570 degrees F. for a period of from about two minutes to about six minutes.

8. The method of treating raw cacao beans which consists in first thoroughly cooling the beans including the nib material thereof to substantially 32 degrees F., and then subjecting the same to a temperature of substantially 525 degrees F. for a period of from about two minutes to about six minutes.

9. The method which consists in first thoroughly refrigerating raw cacao beans including the nib material thereof, then subjecting the refrigerated beans to a high temperature for such period of time as to render the shells thereof weak and brittle but to avoid substantial loss of the volatile organic constituents from the nib material of the beans, then vacuum drying the beans and removing the shells of the dried beans.

JAMES J. BAJDA.